United States Patent
Harrall et al.

(10) Patent No.: US 6,935,430 B2
(45) Date of Patent: *Aug. 30, 2005

(54) METHOD AND APPARATUS FOR EXPANDING A WELDED CONNECTION

(75) Inventors: Simon J. Harrall, Inverurie (GB); Paul D. Metcalfe, Peterculter (GB); Robert P. Badrak, Sugar Land, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 163 days.

This patent is subject to a terminal disclaimer.

(21) Appl. No.: 10/375,922

(22) Filed: Feb. 27, 2003

(65) Prior Publication Data

US 2004/0149450 A1 Aug. 5, 2004

Related U.S. Application Data

(63) Continuation-in-part of application No. 10/356,360, filed on Jan. 31, 2003.

(51) Int. Cl.$^7$ .......................... E21B 43/10; E21B 19/00
(52) U.S. Cl. ...................... 166/380; 166/384; 166/207; 166/242.7
(58) Field of Search ............................. 166/242.7, 380, 166/384, 207; 228/112.1, 155

(56) References Cited

U.S. PATENT DOCUMENTS

| 3,565,192 A | * | 2/1971 | McLarty ..................... 175/246 |
| 3,844,007 A | * | 10/1974 | Kojima ....................... 29/33 A |
| 5,992,329 A | * | 11/1999 | Scheuchzer et al. .......... 104/15 |
| 6,018,859 A | * | 2/2000 | Borzym et al. ............... 29/458 |
| 6,629,567 B2 | * | 10/2003 | Lauritzen et al. ........... 166/380 |
| 2003/0121558 A1 | * | 7/2003 | Cook et al. .................... 138/98 |
| 2004/0045616 A1 | * | 3/2004 | Cook et al. .................... 138/98 |

FOREIGN PATENT DOCUMENTS

WO    WO2004007134    *    1/2004

* cited by examiner

*Primary Examiner*—William Neuder
(74) *Attorney, Agent, or Firm*—Moser, Patterson & Sheridan, LLP (57) ABSTRACT

The present invention generally relates to methods of connecting two expandable tubulars. In one aspect, the method includes flash welding the ends of the expandable tubulars together. Thereafter, the connected tubulars are lowered into the wellbore for expansion. The flash welding process provides a highly reliable joint for expansion. In another aspect, the present invention provides a method for expanding a non-uniform tubular. In one embodiment, the non-uniform tubular is formed by connecting two misaligned tubulars.

22 Claims, 5 Drawing Sheets

METHOD AND APPARATUS FOR EXPANDING A WELDED CONNECTION

CROSS-REFERENCE TO RELATED APPLICATIONS

This application is a continuation-in-part of co-pending U.S. patent application Ser. No. 10/356,360, entitled "Flash Welding Process For Field Joining of Tubulars For Expandable Application", filed on Jan. 31, 2003, which patent application is herein incorporated by reference.

BACKGROUND OF THE INVENTION

1. Field of the Invention

The present invention relates to wellbore completion. More particularly, the invention relates to apparatus and methods of connecting two tubulars. More particularly still, the invention relates to apparatus and methods of connecting two expandable tubulars at the well site.

2. Description of the Related Art

In the drilling of oil and gas wells, a wellbore is formed using a drill bit that moves downwardly at a lower end of a drill string. After drilling a predetermined depth, the drill string and bit are removed, and the wellbore is typically lined with a string of steel pipe called casing. The casing provides support to the wellbore and facilitates the isolation of certain areas of the wellbore adjacent hydrocarbon bearing formations. The casing typically extends down the wellbore from the surface of the well to a designated depth. An annular area is thus defined between the outside of the casing and the earth formation. This annular area is filled with cement to permanently set the casing in the wellbore and to facilitate the isolation of production zones and fluids at different depths within the wellbore.

It is common to employ more than one string of casing in a wellbore. In this respect, a first string of casing is set in the wellbore when the well is drilled to a first designated depth. The well is then drilled to a second designated depth, and a second string of casing, or liner, is run into the well to a depth whereby the upper portion of the second liner overlaps the lower portion of the first string of casing. The second liner string is then fixed or hung in the wellbore, usually by some mechanical slip mechanism well-known in the art, and cemented. This process is typically repeated with additional casing strings until the well has been drilled to total depth.

However, one drawback of this process is that as the wellbore is extended, the inner diameter of the well progressively decreases. This is because subsequent liners must have an outer diameter that is smaller than an inner diameter of earlier casings in order to pass through the earlier casings. As a result, top-hole sizes must be sufficiently large so that the final casing has the desired inner diameter size.

Recently, expandable tubular technology has been developed to overcome this problem. Generally, expandable technology enables a smaller diameter tubular to pass through a larger diameter tubular, and thereafter expanded to a larger diameter. In this respect, expandable technology permits the formation of a tubular string having a substantially constant inner diameter, otherwise known as a monobore. Accordingly, monobore wells have a substantially uniform through-bore from the surface casing to the production zones.

A monobore well features each progressive borehole section being cased without a reduction of casing size. The monobore well offers the advantage of being able to start with a much smaller surface casing but still end up with a desired size of production casing. Further, the monobore well provides a more economical and efficient way of completing a well. Because top-hole sizes are reduced, less drilling fluid is required and fewer cuttings are created for cleanup and disposal. Also, a smaller surface casing size simplifies the wellhead design as well as the blow out protectors and risers. Additionally, running expandable liners instead of long casing strings will result in valuable time savings.

Typically, expandable liners are constructed of multiple tubulars connected end to end. The tubulars are generally connected using a threaded connection. As the threads are made up, a metal-to-metal seal is created between the two tubulars. Thereafter, the entire length of the expandable liner is deployed into the wellbore. The expandable liners are typically expanded by the use of a cone-shaped mandrel or by an expander tool, such as a rotary expander tool having one or more rollers.

A problem arises when the threaded connection is expanded. Generally, the male and female threads of a threaded connection are specifically designed to mate with each other to form a fluid tight seal. However, the specifications of the threads do not take into account the expansion of the threaded connection. By plastically deforming or expanding the threaded connection, the requirements of the threads to form a fluid tight seal are necessarily altered. For example, the tight metal-to-metal seal created between the female thread and the male thread becomes slack, thereby jeopardizing the seal at the threaded connection.

A need, therefore, exists for an expandable tubular connection. There is a further need for a method of forming a tubular connection that maintains a fluid tight seal upon expansion of the tubular connection.

SUMMARY OF THE INVENTION

The present invention generally relates to methods of connecting two expandable tubulars. In one aspect, the method includes flash welding the ends of the tubulars together. The flash welding process provides a highly reliable joint for expansion.

In another aspect, the present invention provides an apparatus for connecting a first tubular to a second tubular. The apparatus includes a housing disposed around an end of the first tubular and the second tubular. The apparatus may also include one or more sealing elements disposed within each of the tubulars. A conductive member may be connected to each end of the tubulars to conduct a current. The apparatus may also include a translational member for moving the first tubular toward the second tubular to join the heated tubular ends.

In another aspect, the present invention generally relates to methods of completing a well. In one embodiment, the method includes flash welding the ends of two expandable tubulars together. Thereafter, the connected tubulars are lowered into the wellbore to a predetermined location. Then, the connected tubulars are expanded in the wellbore.

In another aspect, the present invention provides a method of completing a well. The method involves flash welding a first tubular to a second tubular. The method includes disposing a housing around an end of the first tubular and an end of the second tubular. Thereafter, a non-flammable gas may be provided within the housing to facilitate the welding process and/or prevent ingress of flammable mixtures of hydrocarbons. After the tubulars have been joined, the tubulars may be expanded downhole.

In another aspect, a method of expanding a tubular includes providing a non-uniform tubular and expanding the non-uniform tubular using a rotary expander tool. In one embodiment, the non-uniform tubular is formed by connecting two misaligned tubulars. Preferably, the non-uniform tubular is expanded using a rotary expander tool.

In another aspect, a method of well completion includes connecting an end of a first expandable tubular to an end of a second expandable tubular using a welding process, wherein the first expandable tubular and the second expandable tubular form a non-uniform tubular. The non-uniform tubular is lowered into the wellbore and expanded downhole. In one embodiment, the non-uniform tubular is formed by a misalignment of the first tubular and the second tubular. In another embodiment, the non-uniform tubular has a non-uniform wall thickness along its length. In another embodiment still, the non-uniform tubular is not substantially straight along its length. Preferably, the non-uniform tubular is expanded using a rotary expander tool against an inner wall of the non-uniform tubular.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
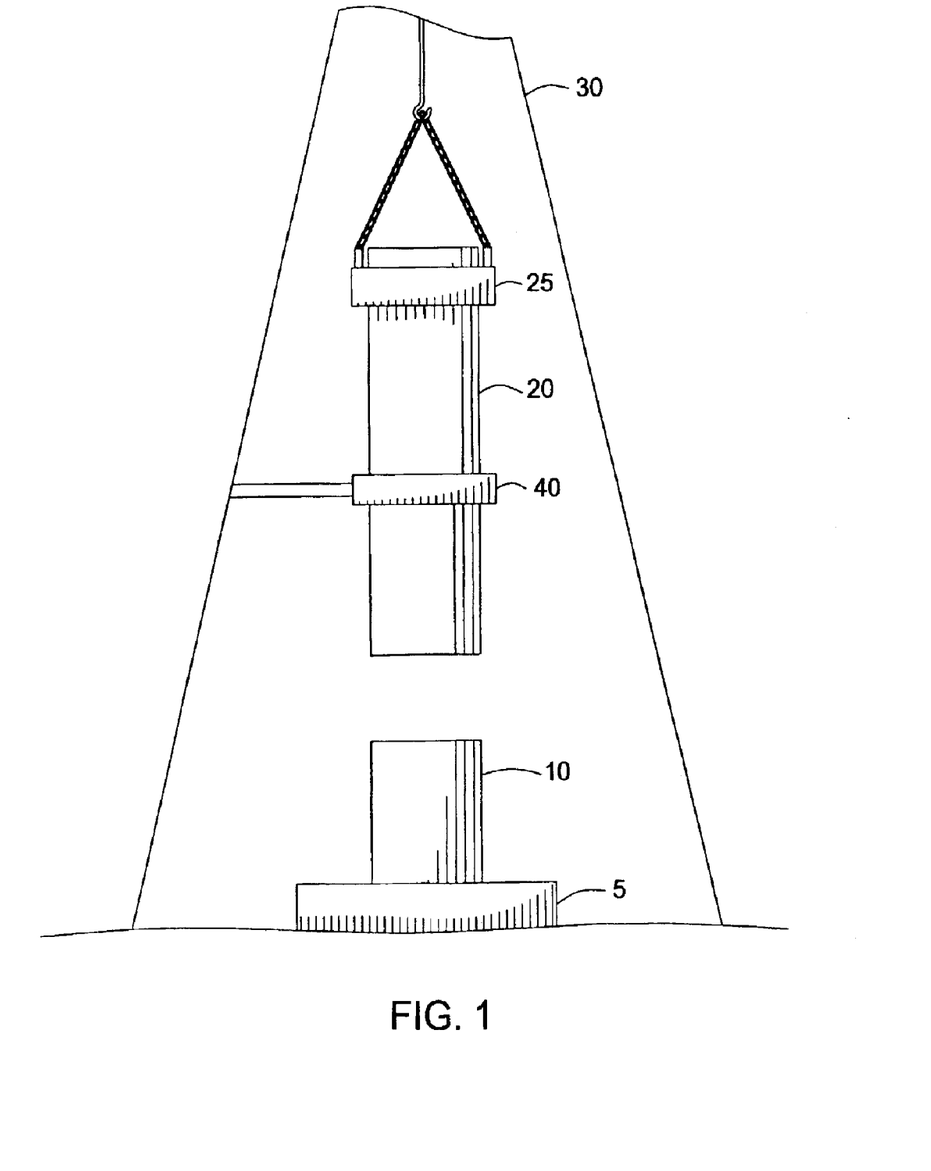
FIG. 1 is a cross-sectional view of a tubular positioned above another tubular held in a wellhead.

Aspects of the present invention provide apparatus and methods of connecting expandable tubulars using flash welding. FIG. 1 is a schematic view of a first tubular 10 ready to be joined with a second tubular 20. As shown, the first tubular 10 at least partially extends above the wellhead 5 and is held in place by a spider (not shown). The second tubular 20 is suspended above the first tubular 10 by an elevator 25 operatively connected to the rig 30. A tubular handling device 40 attached to the rig 30 may be used to help position the second tubular 20.

In one embodiment, the first and second tubulars 10, 20 are expandable tubulars to be joined and expanded downhole. Examples of expandable tubulars include expandable solid tubulars, expandable slotted tubulars, expandable screens, and combinations thereof. Further, the first and second tubulars 10, 20, as used herein, may include a single tubular or a tubular string formed by more than one tubular.

Figure 2:
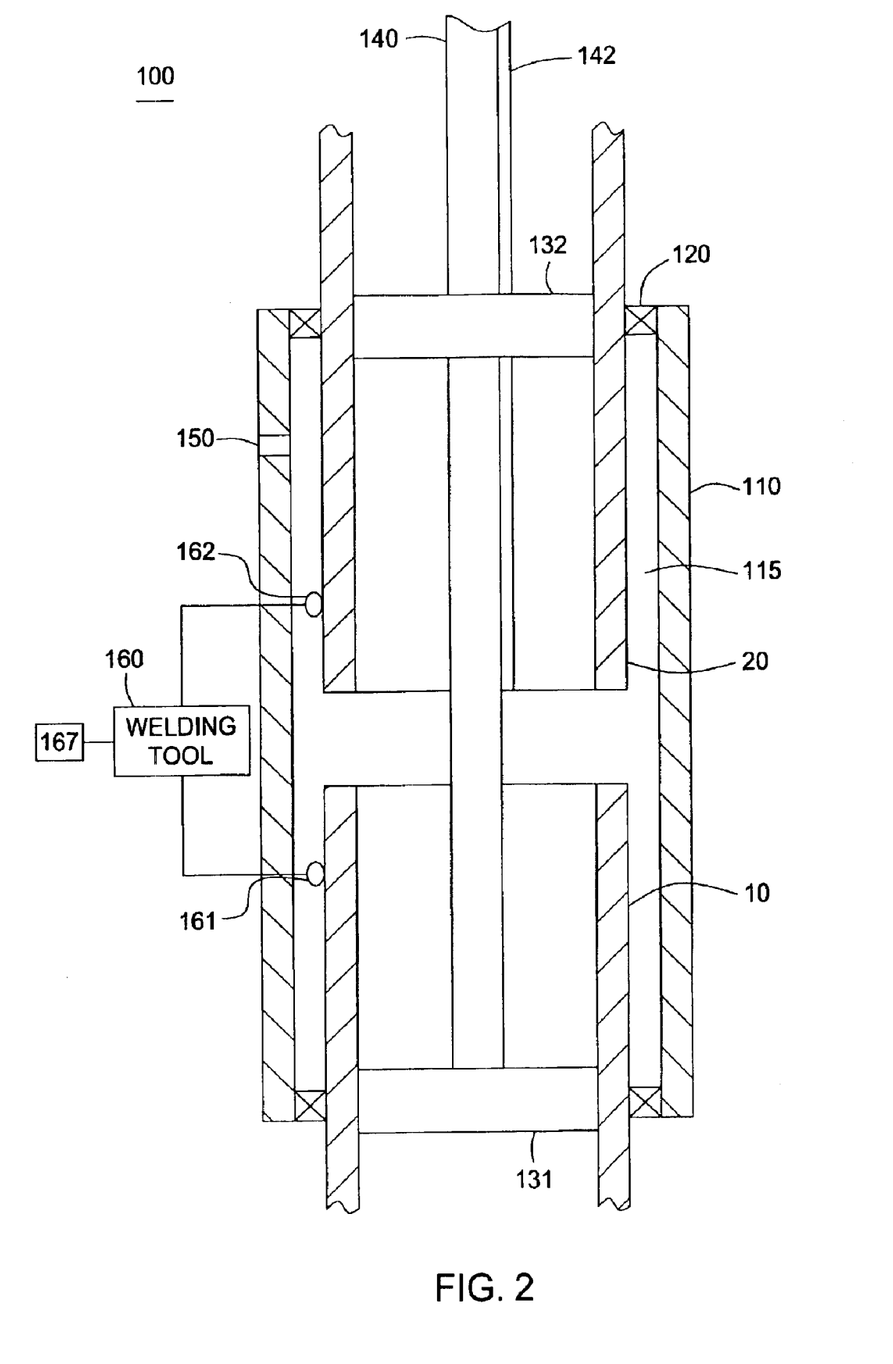
FIG. 2 is schematic view of an apparatus for flash welding two tubulars.

FIG. 2 shows an apparatus 100 for flash welding the second tubular 20 to the first tubular 10 according to aspects of the present invention. The apparatus 100 includes a tubular housing 110 at least partially disposed around the first and second tubulars 10, 20. One end of the housing 110 overlaps the first tubular 10 while the other end of the housing 110 overlaps the second tubular 20. Preferably, an inner diameter of the housing 110 is larger than an outer diameter of the tubulars 10, 20 such that an annular space 115 is formed therebetween. The housing 110 should be made from a material capable of tolerating high temperatures, such as metal. In one embodiment, the housing 110 defines a single sleeve tubular. In another embodiment, the housing 110 defines two arcuate portions hinged together. Spacers 120 may be placed at each end of the housing 110 to seal off the annular space 115. The spacers 120 may be made from an elastomeric material, metal, or combinations thereof.

One or more sealing elements 131, 132 may be placed within the first and second tubulars 10, 20 to seal off the bores of the tubulars 10, 20. In one embodiment, inflatable packers 131, 132 are used to seal off the tubulars 10, 20. The inflatable packers 131, 132 may be connected to a tubular conveying member 140 for positioning the inflatable packers 131, 132. The conveying member 140 may be in fluid communication with the packers 131, 132 so that it may provide pressure to actuate the packers 131, 132. In another embodiment, the sealing elements 131, 132 may be formed of a water soluble material. The water soluble sealing elements 131, 132 may be caused to dissolve immediately after flash welding the tubulars together. Alternatively, the water soluble sealing elements 131, 132 may remain in the tubulars 10, 20 after the connection is made and dissolved at a later time.

In another aspect, the conveying member 140 may optionally include a second conveying member 142 for providing gas into the area enclosed by the packers 131, 132 and the housing 110. Preferably, the supplied gas is an inert gas, a non-flammable gas, or combinations thereof. The inert gas may supplant or dilute the air in the enclosed area, thereby decreasing the possibility of oxide forming on the heated tubulars 10, 20. Impurities such as oxide formed during the welding process are undesirable because they weaken the bond between the joined tubulars 10, 20. In another embodiment, the inert gas may be delivered through one or more ports 150 formed in the housing 110. As shown in FIG. 1, the ports 150 are formed on a wall of the housing 110. However, the ports 150 may also be formed in the spacers 120 or other suitable surface of the housing 110 as is known to a person of ordinary skill in the art. It must be noted that the ports 150 may be used in combination with the second conveying member 142 to inject inert gas into the enclosed area.

The apparatus 110 may also include a welding tool 160, which is schematically shown in FIG. 2. The welding tool 160 may be used to supply the current necessary to perform the flash welding process. The welding tool 160 may be selected from any suitable flash welding machine as is known to a person of ordinary skill in the art. An exemplary flash welding tool may comprise a bank of 12 volt lead-acid batteries or a direct current generator with appropriate tubular gripping members to handle the relative positioning of the tubular members throughout the joining process. As schematically shown in FIG. 2, the welding tool 160 has at least one conductive member 161, 162 for contacting each tubular 10, 20. In one embodiment, clamps 161, 162 are used to contact the tubulars 10, 20 to provide current to the tubulars 10, 20 for the flash welding process. The welding tool 160 may further include a translational member 167 for moving the tubulars 10, 20 toward each other. In one embodiment, the translational member 167 may comprise a piston and cylinder assembly to bring the clamps 161, 162 closer to each other. Upon actuation, the piston and cylinder assembly 167 may cause the first tubular 10 to move closer to the second tubular 20.

In operation and as one example of the process, the second tubular 20 is positioned above the first tubular 10 in the wellbore as shown in FIG. 1. Once in position, a clamp 161, 162 is attached to each tubular 10, 20 proximate the ends of the tubular 10, 20 to be joined. Thereafter, the housing 110 is disposed around the tubulars 10, 20. An inflatable packer 131, 132 is then placed in the bore of each tubular 10, 20. Fluid is supplied to the inflatable packers 131, 132 to actuate the packers 131, 132, thereby sealing off the bores of the tubulars 10, 20. After the packers 131, 132 are actuated, inert gas is injected into the enclosed area to displace most of the air. Preferably, the inert gas is injected through the ports 150 of the housing 110.

The welding process begins by bringing the tubulars 10, 20 into contact with each other. During the flash welding process, current is applied to each tubular 10, 20 through the clamps 161, 162. The current applied initially results in heating of each tubular 10, 20 due to the electrical circuit formed by contacting the tubular ends. The resistance that naturally occurs at the interface between the tubulars 10, 20 causes the "flashing" for which the joining process is known. The flashing action continues until the ends of the tubulars 10, 20 reach a plastic state and a predetermined temperature. The plastic portion and the adjacent heated portion of the tubulars 10, 20 are commonly referred to as the heat-affected zone, or HAZ.

The flash welding process concludes with the upset or forging action. When the tubulars 10, 20 have reached the plastic state and the proper temperature, the ends of the tubulars 10, 20 are brought together with enough force to cause the tubular ends to upset. Particularly, the piston and cylinder assembly 167 of the welding tool 160 is actuated to cause the contacting end of the second tubular 20 to move into the contacting end of the first tubular 10. The speed of the movement between tubulars 10, 20 for the upset action may be controlled by adjusting the piston size or rate of pressure increase. The upset action forces the plastic portions and most of the impurities out of the formed joint.

EXAMPLE

In one example, two expandable tubulars having about 2" outer diameters and about 0.156" wall thickness are joined in accordance with the aspects of the present invention. The initial spacing gap between the tubulars was 0.25". The starting flash was set when the relative position between the two clamps was about 3.5". The upset was initiated at a relative clamp position of about 2" with an upset pressure of 600 psi. During the welding process, the voltage was set at about 12 VAC and the total cycle time including positioning was about 30 seconds. The final relative clamp position was between about 0.8" to about 1.2".

The flash welding process may optionally include an additional preheating action. In one embodiment, the ends of the tubulars 10, 20 may be caused to oscillate against each other. Initially, the ends are brought together to allow heat to be generated from the resistance of the tubulars 10, 20.

When the ends begin to cool and solidify, the preheating action is repeated and continued in a rapid motion until heat is generated at both ends of the tubulars 10, 20. The preheat stage is performed until the proper HAZ is obtained. Thereafter, the flash weld stage is performed and the two tubular ends are forged together.

Advantages of preheating the tubulars include the ability to weld a large cross-sectional area with lower current demand. Additionally, the temperature gradient may remain more uniform during the process. Finally, heat may be generated in high strength alloys without a large loss of material by the flashing action.

After the proper length of tubular has been formed, the tubular may be lowered into the wellbore along with an expander tool. When the tubular reaches the proper depth in the wellbore, the expander tool is actuated to expand the tubular. Examples of the expander tool include rotary expander tools and cone-shaped mandrels. Furthermore, the expander may be a compliant or a non-compliant expander tool. In this respect, the flash welded joint is plastically deformed, but retains its fluid tight seal. In this manner, expandable tubulars may be joined and expanded downhole.

Figures 3, 4:
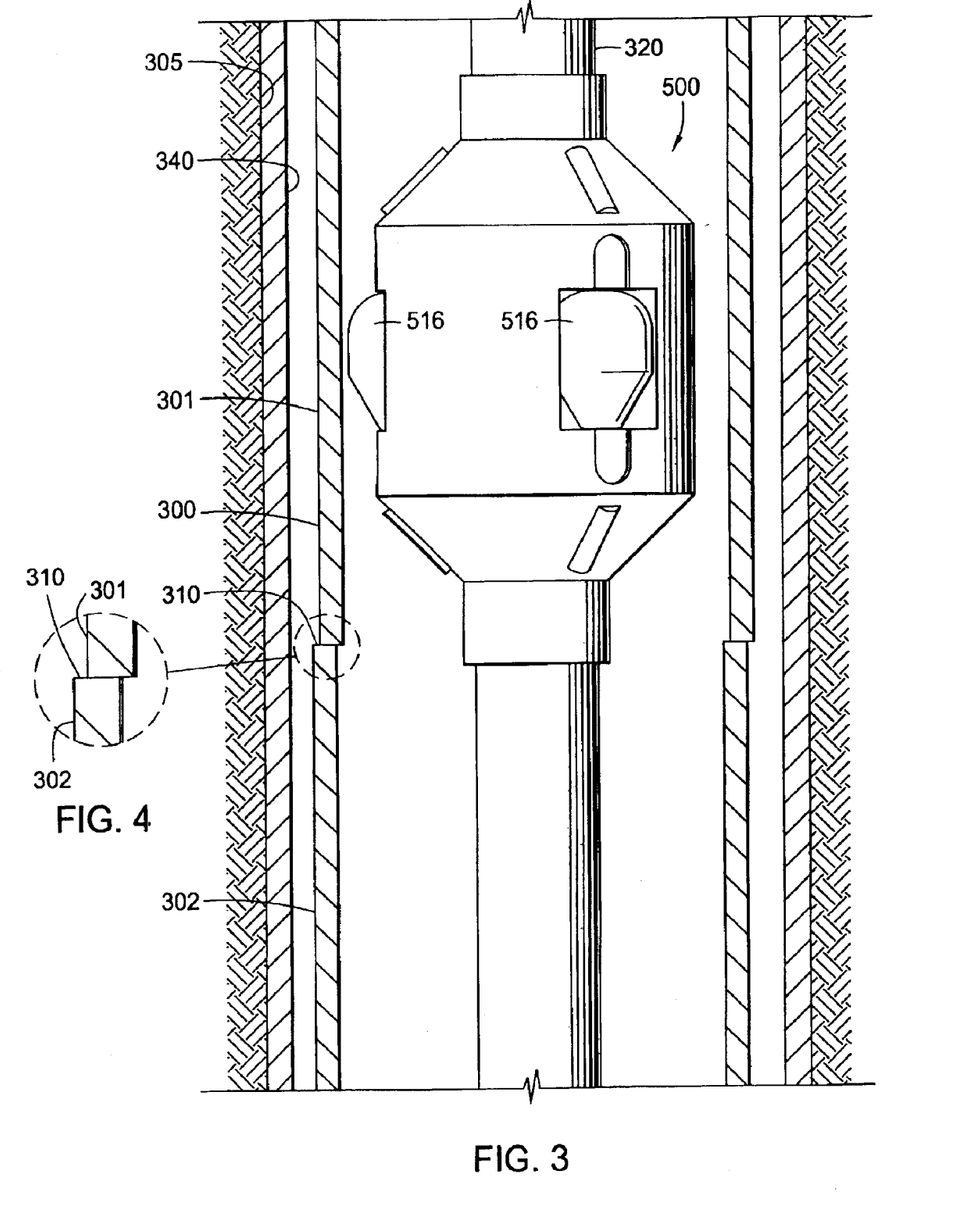
FIG. 3 is a cross-sectional view of a welded tubular formed by two misaligned tubular sections. As shown, the welded tubular is disposed in a cased wellbore.
FIG. 4 is an exploded view of the welded joint connecting the tubular sections.

In another aspect, the present invention provides methods and apparatus for expanding a non-uniform tubular. In one embodiment, the non-uniform tubular is a welded tubular 300 formed by connecting two misaligned tubular sections together. FIG. 3 shows a welded tubular 300 disposed in a wellbore 305 ready for expansion. The welded tubular 300 is formed by welding two tubular sections 301, 302 together. As shown, the tubular sections 301, 302 became misaligned during the welding process, thereby forming the non-uniform tubular 300.

FIG. 4 is an enlarged view of the welded joint 310 connecting the two tubular sections 301, 302. It can be seen that the two tubular sections 301,302 did not align properly during the welding process. The misalignment of the tubular sections 301, 302 effectively creates a transition in wall thickness of the welded tubular 300. As a result, the welded joint 310 constitutes a structural weakness in the wall of the welded tubular 300 during expansion. Therefore, if the tubular 300 is expanded with an expander tool having 360 degrees contact with the inner surface of the tubular 300, the expander tool 500 will most likely tear or perforate the tubular 300 where it is structurally weaker, e.g., in the thinner wall area. There is a need, therefore, for an apparatus for expanding a non-uniform tubular 300.

Figure 5:
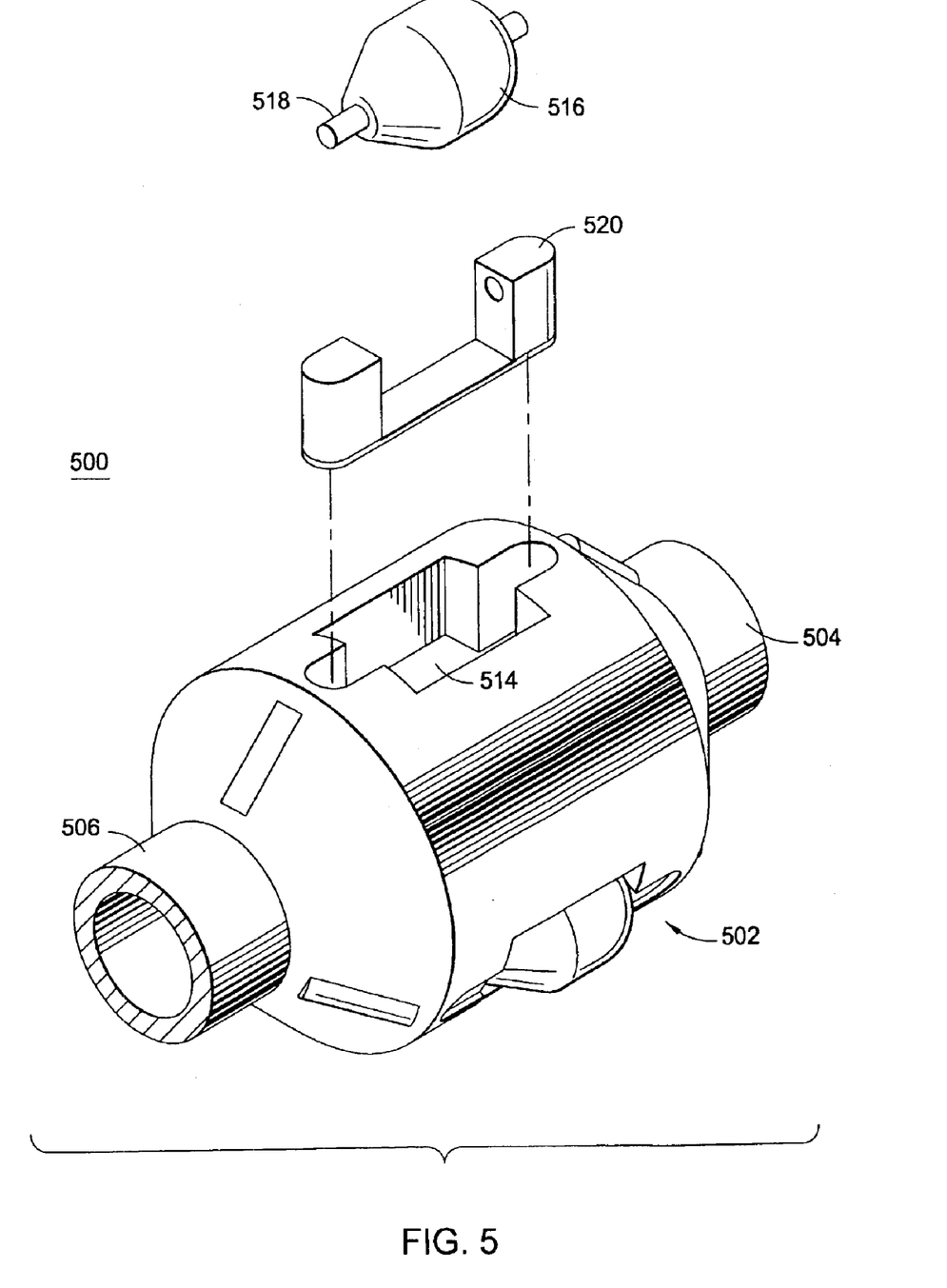
FIG. 5 is an exploded view of an exemplary expander tool for expanding the tubular.

According to aspects of the present invention, the non-uniform tubular 300 may be expanded by a rotary expander tool 500 as shown in FIG. 5. FIG. 5 is an exploded view of an exemplary expander tool 500 for expanding the tubular 300. The non-uniform tubular 300 is expanded by the rotary expander tool 500 acting outwardly against the inside surface of the tubular 300. The expander tool 500 has a body 502, which is hollow and generally tubular with connectors 504 and 506 for connection to other components (not shown) of a downhole assembly. The connectors 504 and 506 are of a reduced diameter compared to the outside diameter of the longitudinally central body part of the tool 500. The central body part 502 of the expander tool 500 shown in FIG. 5 has three recesses 514, each holding a respective roller 516. Each of the recesses 514 has parallel sides and extends radially from a radially perforated tubular core (not shown) of the tool 500. Each of the mutually identical rollers 516 is somewhat cylindrical and barreled. Each of the rollers 516 is mounted by means of an axle 518 at each end of the respective roller 516 and the axles are mounted in slidable pistons 520. The rollers 516 are arranged for rotation about a respective rotational axis that is parallel to the longitudinal axis of the tool 500 and radially offset therefrom at 120-degree mutual circumferential separations around the central body 502. The axles 518 are formed as integral end members of the rollers 516, with the pistons 520 being radially slidable, one piston 520 being slidably sealed within each radially extended recess 514. The inner end of each piston 520 is exposed to the pressure of fluid within the hollow core of the tool 500 by way of the radial perforations in the tubular core. In this manner, pressurized fluid provided from the surface of the well, via a working string 320, can actuate the pistons 520 and cause them to extend outward whereby the rollers 516 contact the inner wall of a tubular 300 to be expanded.

FIG. 3 is a partial section view of a non-uniform tubular 300 disposed in a wellbore 305. The tubular 300 is disposed coaxially within the casing 340. An expander tool 500 attached to a working string 320 is visible within the tubular 300. Preferably, the tubular 300 is run into the wellbore 305 with the expander tool 500 disposed therein. The working string 320 extends below the expander tool 500 to facilitate cementing of the tubular 300 in the wellbore 305 prior to expansion of the tubular 300 into the casing 340. A remote connection (not shown) between the working, or run-in, string 320 and the tubular 300 temporarily connects the tubular 300 to the run-in string 320 and supports the weight of the tubular 300. In one embodiment of the present invention, the temporary connection is a collet (not shown), and the tubular 300 is a string of casing.

FIG. 3 depicts the expander tool 500 with the rollers 516 retracted, so that the expander tool 500 may be easily moved within the tubular 300 and placed in the desired location for expansion of the tubular 300. In operation, hydraulic fluid (not shown) is pumped from the surface to the expander tool 500 through the working string 320. When the expander tool 500 has been located at the desired depth, hydraulic pressure is used to actuate the pistons (not shown) and to extend the rollers 516 so that they may contact the inner surface of the tubular 300, thereby expanding the tubular 300.

Figure 6:
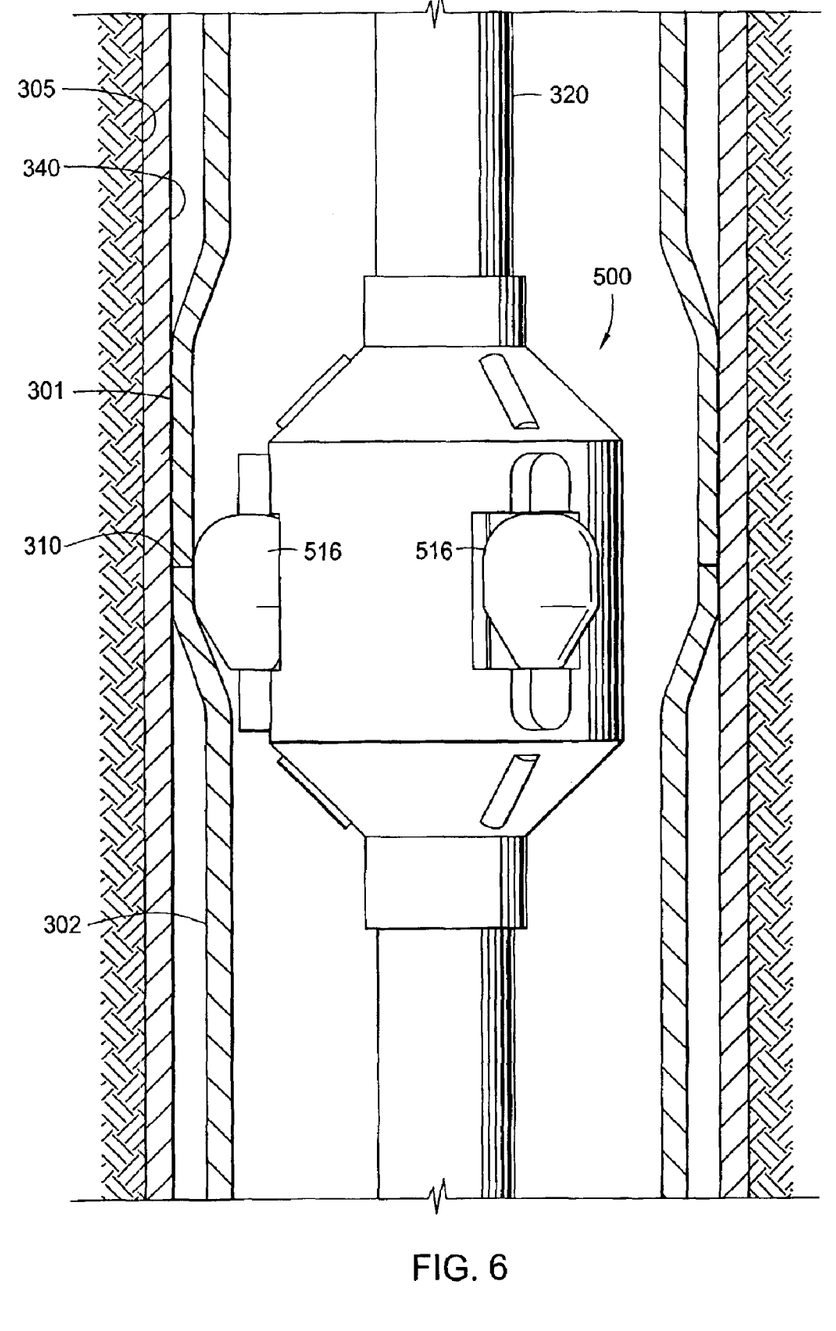
FIG. 6 is a partial section view of the welded tubular partially expanded in the wellbore.

FIG. 6 is a partial section view of the tubular 300 partially expanded by the expander tool 500. At a predetermined pressure, the pistons (not shown) in the expander tool 500 are actuated and the rollers 516 are extended until they contact the inside surface of the tubular 300. The rollers 516 of the expander tool 500 are further extended until the rollers 516 plastically deform the tubular 300 into a state of permanent expansion. The working string 320 and the expander tool 500 are rotated and axially translated during the expansion process, and the tubular 300 is expanded until the tubular's outer surface contacts the inner surface of the casing 340. As shown, the expander tool 500 has moved past the welded joint 310 and successfully expanded the misaligned tubulars 301, 302 against the casing 340.

According to aspects of the present invention, rotary expansion accommodates anomalies or non-uniformity in the tubular during the expansion process. The contact points between the rotary expander tool 500 and the tubular 300 are limited to the rollers 516. As such, only the portions of the tubular 300 in direct contact with rollers 516 are expanded. Therefore, when the rollers 516 reach the welded joint 310, it will only expand the welded joint 310 to a small degree. Thereafter, the rollers 516 will move pass the thinner portions of the tubular 300 and expand the thicker portions. In this manner, a rotary expander tool may be used to expand a non-uniform tubular.

One advantage of the present invention is that tubulars having a wider range of specifications may be expanded downhole. Because the methods provided herein may accommodate anomalies in the tubular specification, tubulars meeting a wider range of specification may be selected for expansion downhole. Consequently, manufacturing and production costs may be reduced.

In another aspect, the non-uniform tubular 300 may include a tubular having non-uniform wall thickness or is not substantially straight along its length. Additionally, aspects of the present invention are also applicable for expanding tubulars that may be damaged when the tubular is expanded with an expander tool having 360 degree contact during expansion.

In another aspect, the present invention contemplates the use of other rotary expander tools known to a person of ordinary skill in the art. For example, the expander tools may include compliant and non-compliant rotary expander tools. As shown in the Figures, the rollers of the expander tool have cylindrical, barrel-shaped cross-sections. However, it is to be appreciated that other roller shapes are possible. For example, a roller may have a cross sectional shape that is conical, truncated conical, semi-spherical, multifaceted, elliptical or any other cross sectional shape suited to the expansion operation to be conducted within the tubular. In addition to rollers, other types of expander members, including expander pads, may be used with the expander tool without departing from the aspects of the present invention. Furthermore, any number of expander members may be positioned on the expander tool in any configuration as required by the operation.

While the foregoing is directed to embodiments of the present invention, other and further embodiments of the invention may be devised without departing from the basic scope thereof, and the scope thereof is determined by the claims that follow.

We claim:

1. A method of well completion, comprising:
    connecting an end of a first expandable tubular to an end of a second expandable tubular using a welding process, wherein the first expandable tubular and the second expandable tubular form a non-uniform tubular;
    lowering the non-uniform tubular into a wellbore; and
    expanding at least a portion of the non-uniform tubular.
2. The method of claim 1, wherein the non-uniform tubular comprises a misalignment of the first tubular and the second tubular.
3. The method of claim 1, wherein the non-uniform tubular comprises a non-uniform wall thickness along a length of the non-uniform tubular.
4. The method of claim 1, wherein the non-uniform tubular is not substantially straight along a length of the non-uniform tubular.
5. The method of claim 1, wherein the welding process includes:
    causing the ends of the first and second tubulars to become plastic; and
    connecting the two ends of the first and second tubulars together.
6. The method of claim 1, wherein expanding the non-uniform tubular comprises actuating a rotary expander tool against an inner wall of the non-uniform tubular.
7. The method of claim 6, wherein the non-uniform tubular comprises a misalignment of the first tubular and the second tubular.
8. The method of claim 6, wherein the rotary expander tool is a compliant expander tool or a non-compliant expander tool.
9. The method of claim 6, wherein the rotary expander tool comprises an expander member selected from the group consisting of rollers, pads, or combinations thereof.
10. A method of completing a well, comprising:
    disposing a housing around an end of a first tubular to be joined with an end of a second tubular;
    providing the housing with a non-flammable gas;
    connecting the first expandable tubular to the second expandable tubular using a welding process, wherein the first tubular and the second tubular are connected to form a non-uniform tubular; and expanding at least a portion of the non-uniform tubular.

11. The method of claim 10, wherein the non-uniform tubular comprises a misalignment of the first tubular and the second tubular.

12. The method of claim 10, wherein the non-uniform tubular comprises a non-uniform wall thickness along a length of the non-uniform tubular.

13. The method of claim 12, further comprising disposing one or more sealing elements in each of the first and second tubulars.

14. The method of claim 13, wherein the one or more sealing elements is selected from the group consisting of an inflatable packer and a water soluble sealing element.

15. The method of claim 12, wherein the first and second tubulars are connected at a well site.

16. The method of claim 10, wherein the non-uniform is expanded with a rotary expander tool.

17. A method of well completion, comprising:

connecting an end of a first expandable tubular to an end of a second expandable tubular, thereby forming a non-uniform connection;

lowering the first and second expandable tubulars into a wellbore; and expanding at least a portion of the non-uniform connection.

18. The method of claim 17, wherein the first and second expandable tubulars are connected using a welding process.

19. The method of claim 17, wherein the non-uniform connection comprises a misalignment of the first tubular and the second tubular.

20. The method of claim 17, wherein the non-uniform connection comprises a non-uniform wall thickness.

21. The method of claim 17, wherein the non-uniform connection is not substantially straight along a length of the non-uniform tubular.

22. The method of claim 17, wherein expanding the non-uniform connection comprises actuating a rotary expander tool against an inner wall of the non-uniform connection.

* * * * *